United States Patent [19]
Okada et al.

[11] Patent Number: 5,237,363
[45] Date of Patent: Aug. 17, 1993

[54] CAMERA SYSTEM WITH LENS MOVABLE IN VERTICAL DIRECTION TO OPTICAL AXIS OF PHOTO-TAKING LENS

[75] Inventors: Takashi Okada, Osaka; Hiromu Mukai, Kawachinagano; Hideo Kajita; Masatoshi Kamitani, both of Osaka; Katsumi Kosakai; Hiroshi Ootsuka, both of Sakai, all of Japan

[73] Assignee: Minolta Camera Kabushiki Kaisha, Osaka, Japan

[21] Appl. No.: 887,225

[22] Filed: May 18, 1992

Related U.S. Application Data

[63] Continuation of Ser. No. 574,699, Aug. 27, 1990, abandoned.

[30] Foreign Application Priority Data

Aug. 31, 1989 [JP] Japan ................................ 1-227135
Aug. 31, 1989 [JP] Japan ................................ 1-227136

[51] Int. Cl.⁵ ............................................... G03B 7/00
[52] U.S. Cl. ....................................... 354/412; 354/70; 354/195.12; 354/267.1
[58] Field of Search ............... 354/70, 76, 190, 202, 354/430, 457, 412, 195.12, 267.1; 358/222

[56] References Cited

U.S. PATENT DOCUMENTS 4,780,739 10/1988 Kawakami et al. ................ 354/430

Primary Examiner—David M. Gray
Attorney, Agent, or Firm—Price, Gess & Ubell

[57] ABSTRACT

The disclosure relates to the camera system comprises a photo-taking lens including a lens unit movable in direction other than parallel to an optcical axis of the photo-taking lens and a driver unit for driving the movable lens unit in the direction other thatn parallel to the optical axis of the photo-taking lens during a exposure operation. Therefore the camera system is capable of taking photography with special effect.

18 Claims, 9 Drawing Sheets

CAMERA SYSTEM WITH LENS MOVABLE IN VERTICAL DIRECTION TO OPTICAL AXIS OF PHOTO-TAKING LENS

This is a continuation of application Ser. No. 574,699, filed on Aug. 27, 1990, for a CAMERA SYSTEM WITH LENS MOVABLE IN VERTICAL DIRECTION TO OPTICAL AXIS OF PHOTO-TAKING LENS, now abandoned.

BACKGROUND OF THE INVENTION

1. Field of the Invention

This invention relates to a camera capable of taking photographs with effects different from ordinary photographs by making use of a lens unit movable in directions other than parallel to the optical axis and mounted in the photo-taking lens.

2. Description of Prior Art

Photographs with special effects, for example, a soft effect and a starburst effect, were conventionally taken by attaching optical filters causing various special effects on a photo-taking lens. Now, some auto-focus cameras are designed to slightly shift the focusing lens in the direction of the optical axis at exposure by using the auto-focus function so as to compulsorily make an image out of focus, thereby obtaining a soft focus effect.

In the methods using optical filters, however, it was necessary to prepare a variety of filters depending on the desired special effect, and to provide many optical filters for each special effect because one special effect required several kinds of filters depending on the degree of the effect. As a result, the equipment for taking special effect photographs became large and inconvenient. Moreover, it was necessary to repeatedly mount and dismount filters making it complicated to take special effect photographs.

In the method taking advantage of auto-focusing the shifting direction of the focusing lens is constant, so obtainable effects were limited, and a variety of special effects were not possible.

Further, cameras capable of changing the light path of the photo-taking lens so as to change the proportions and perspective of the subject image projected on the film were presented. For example, the Japanese Laid-Open Patent No. 63-197926 discloses an optical unit designed to mount a swing and tilt mechanism in front of the photo-taking lens, and changes the light path of the photo-taking lens by operation of the swing and tilt mechanism, thereby freely changing the proportions and perspective.

The above optical unit, however, required lenses and a control unit exclusive for obtaining swing and tilt effect, and therefore the photo-taking lens structure became complicated.

SUMMARY OF THE INVENTION

It is an object of this invention to present a camera producing various special effects, including a soft effect, without using optical filters.

It is another object of this invention to present a camera with a simple structure capable of freely varying the proportions and perspective of the image without requiring an exclusive lens or control unit.

DETAILED DESCRIPTION OF THE INVENTION

Figure 1:
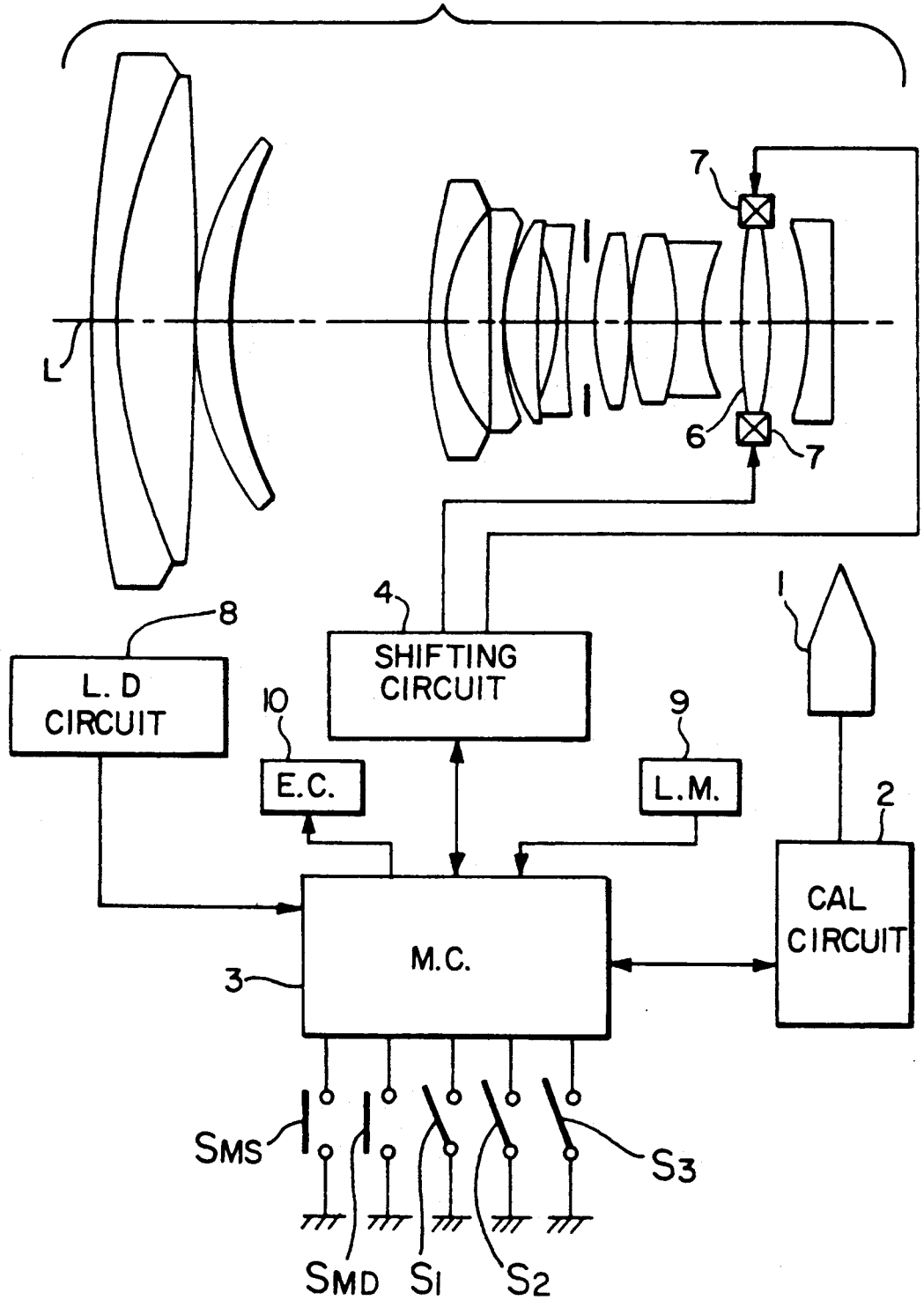
FIG. 1 is a block diagram showing structure of the first embodiment of this invention.

FIG. 1 is a system configuration of the camera according to this invention. In this drawing, 1 is an image sensor which detects displacement of the image-forming position of a subject on a film caused by camera shake. The image movement sensor 1 is composed of, for example, an angle-speed sensor detecting angle change of the entire optical system, acceleration sensor detecting relative acceleration of two different positions in the optical system, or a sensor directly detecting displacement of subject image-forming position. 2 is an image movement calculation circuit calculating movement of image on the film from the detecting signal sent from the above image movement sensor 1, and 3 is a microcomputer controlling actions of actuators of the camera and controlling the entire photo-taking action.

Figure 2:
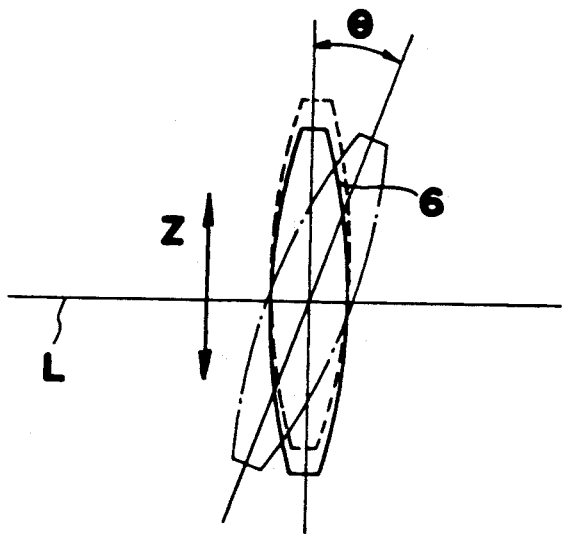
FIG. 2 is a side elevation showing the moving direction of a movable lens.
Figure 3:
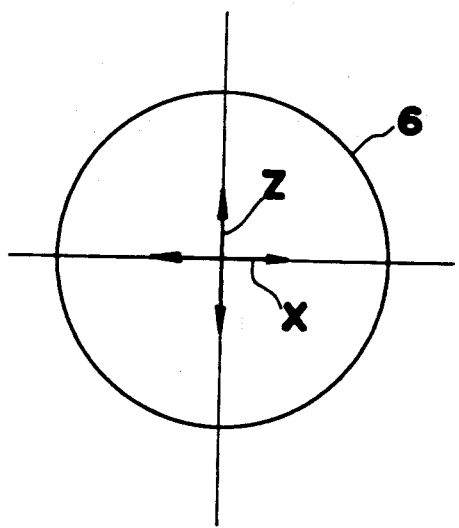
FIG. 3 is a front view showing the moving direction of the movable lens.

Microcomputer 3, in a camera shake correction mode explained below, judges whether camera shake can be corrected or not by image movement data entered from the above image movement calculation circuit 2, delivers camera shake data to the lens shifting calculation circuit 4 described below when camera shake is correctable, and controls the drive of movable lens 6 which is described below. Microcomputer 3, in a special effect mode, delivers image movement amount data of the subject image on the film corresponding to the selected special effect mode stored in microcomputer 3, to the above movement calculation circuit 4, and controls the drive of movable lens 6. The lens shifting calculation circuit 4 calculates actual shifting amount of movable lens 6 from the above camera shake data or image movement amount data entered from the microcomputer 3. 5 is a photo-taking lens comprising zooming lens group and focusing lens group. Movable lens 6 is located, though changing depending on structure of photo-taking lens 5, preferably near the aperture position or back side thereof (on side of main camera body), and is an optical path changing lens which is movable in $\theta$-direction inclining to the optical axis L of photo-taking lens 5 or vertical direction Z and horizontal direction X to the optical axis L, as shown in FIG. 2 and FIG. 3. 7 is a driving circuit controlling the above movable lens 6, and it makes the above movable lens 6 shift according to the lens shifting amount data sent from the above lens shifting calculation circuit 4. 8 is a lens data circuit storing a variety of information on the photo-taking lens 5, 9 is a light measuring circuit detecting subject luminance, and 10 is an exposure control circuit controlling exposure.

Switches are described next. S1 is a preparation switch which comes on when a release button is partially down. When switch S1 turns on, light measuring and metering (focus detection) for photo-taking are carried out, and at the same time, shifting amount data for correcting camera shake is calculated, which is described below. S2 is a release switch which comes on when release button is pushed down. Turning on switch S2 causes the start of photo-taking. S3 is a switch detecting the end of the photo-taking sequence, and it turns on when exposure ends and film winding is finished. SMD is a mode change switch. The camera of this embodiment provides, aside from normal mode, camera shake correction mode, which is described below, and four special effect modes I thru IV, and when switch SMD is off, normal mode is in operation. The camera shake correction mode and special effect modes I thru IV can be selected when the switch SMD is on. SMS is a mode selection switch of the above special modes, and by pressing switch SMS, the mode changes cyclically to the above camera shake correction mode and four special effect modes I thru IV, and thereby selecting a mode. Next, camera shake correction mode and special effect modes are described below.

The camera shake correction mode is to cancel image movement or camera shake generated when taking photographs at high magnification or low shutter speeds, by shifting movable lens 6. A still image can thereby be formed on the film, which is then exposed so that photo-taking without image movement can be realized. When switch S1 is turned on, together with preparation for photo-taking including light measuring and metering, the image movement data of subject on the film is calculated by image movement sensor 1 and image movement calculation circuit 2. Microcomputer 3 takes in image movement data, judges whether image movement can be corrected or not from image movement data or the above light measuring data, and when correction of the camera shake is judged possible, delivers the above image movement data to lens shifting calculation circuit 4 during film exposure or when only the above switch S1 is on. Lens shifting calculation circuit 4 calculates the direction and amount to shift the movable lens 6 from the above image movement amount data, and delivers calculated data to driving circuit 7. Driving circuit 7 makes movable lens 6 shift in a vertical or inclining direction to the optical axis L of photo-taking lens 5 so as to cancel the image movement of the subject on the film without deteriorating performances of photo-taking lens 5 according to the entered direction and distance of shifting.

Special effects modes make special effects on photographs such as soft focusing by shifting above movable lens 6, and four special effect modes I thru IV having different image shifting directions of the subject are provided.

Figure 4:
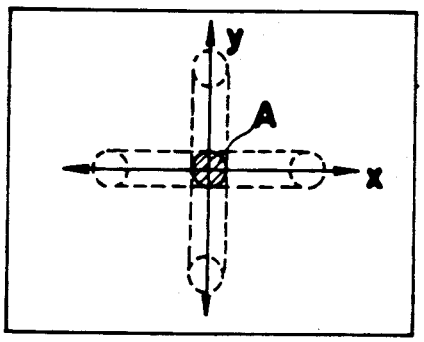
FIG. 4 is an explanatory drawing of special effect mode I.

Mode I is, as shown in FIG. 4, to move image A of subject during exposure linearly in two directions, X-axis and Y-axis which are orthogonal to each other. By mode I, beams crossing in X and Y directions can be drawn and an effect closer to a special effect with a cross-filter can be obtained. The above direction in X-axis can be set not only in a horizontal direction but also in an arbitrary direction. Its contrast ratio can also be adjusted by controlling moving speed of the movable lens depending on light measuring data.

Figure 5:
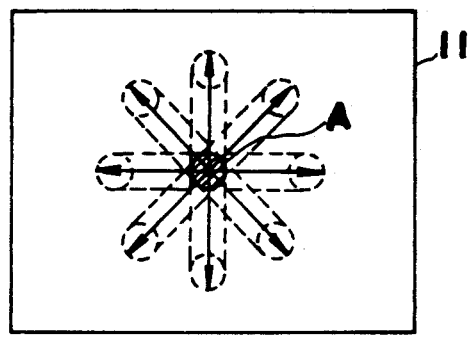
FIG. 5 is an explanatory drawing of special effect mode II.
Figure 6:
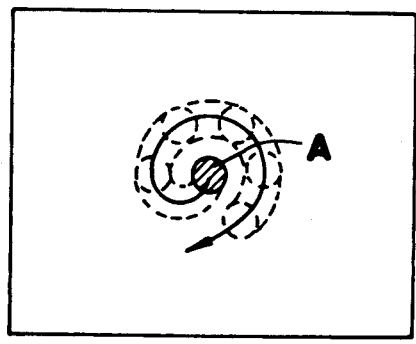
FIG. 6 is an explanatory drawing of special effect mode III.

Mode II is, as shown in FIG. 5, to move image A of subject during exposure linearly in arbitrary multiple directions from a reference position and to draw radiate beams. Mode III is, as shown in FIG. 6, to move image A of subject during exposure spirally and to draw circinate beams. In these modes II and III, by moving the image A of the subject at random, effects closer to a special effect with a soft filter can be obtained. In both modes II and III, it is possible to adjust a contrast ratio between the center and peripheral part of image A of subject by controlling the shifting speed and shifting direction of movable lens 6, thereby bringing a preferable soft focusing effect depending on the light measuring data.

Figure 7:
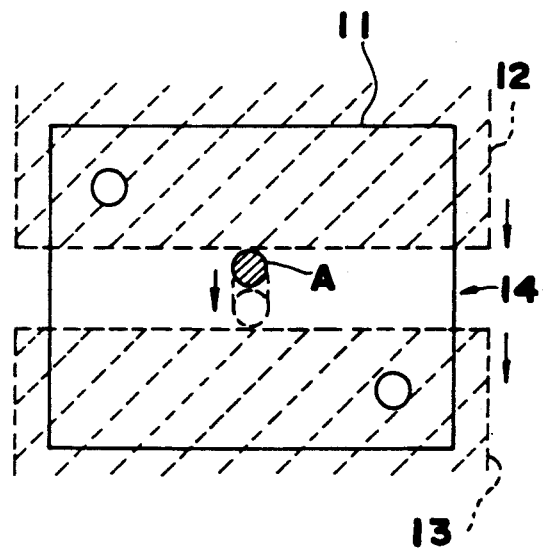
FIG. 7 is an explanatory drawing of special effect mode IV.

Mode IV is, as shown in FIG. 7, to move an image A of the subject in slit 14 formed by first blind 13 and second blind 12 of a focal-plane shutter by synchronizing with the movement of slit 14. In mode IV, the image A in slit 14 is sequentially extended and exposed. It is also possible in this mode to arbitrarily select the shifting direction of movable lens 6, and therefore image A of subject is moved not only in the moving direction of slit 14 but in an arbitrary direction, for example, in a vertical direction to the moving direction.

Figure 8:
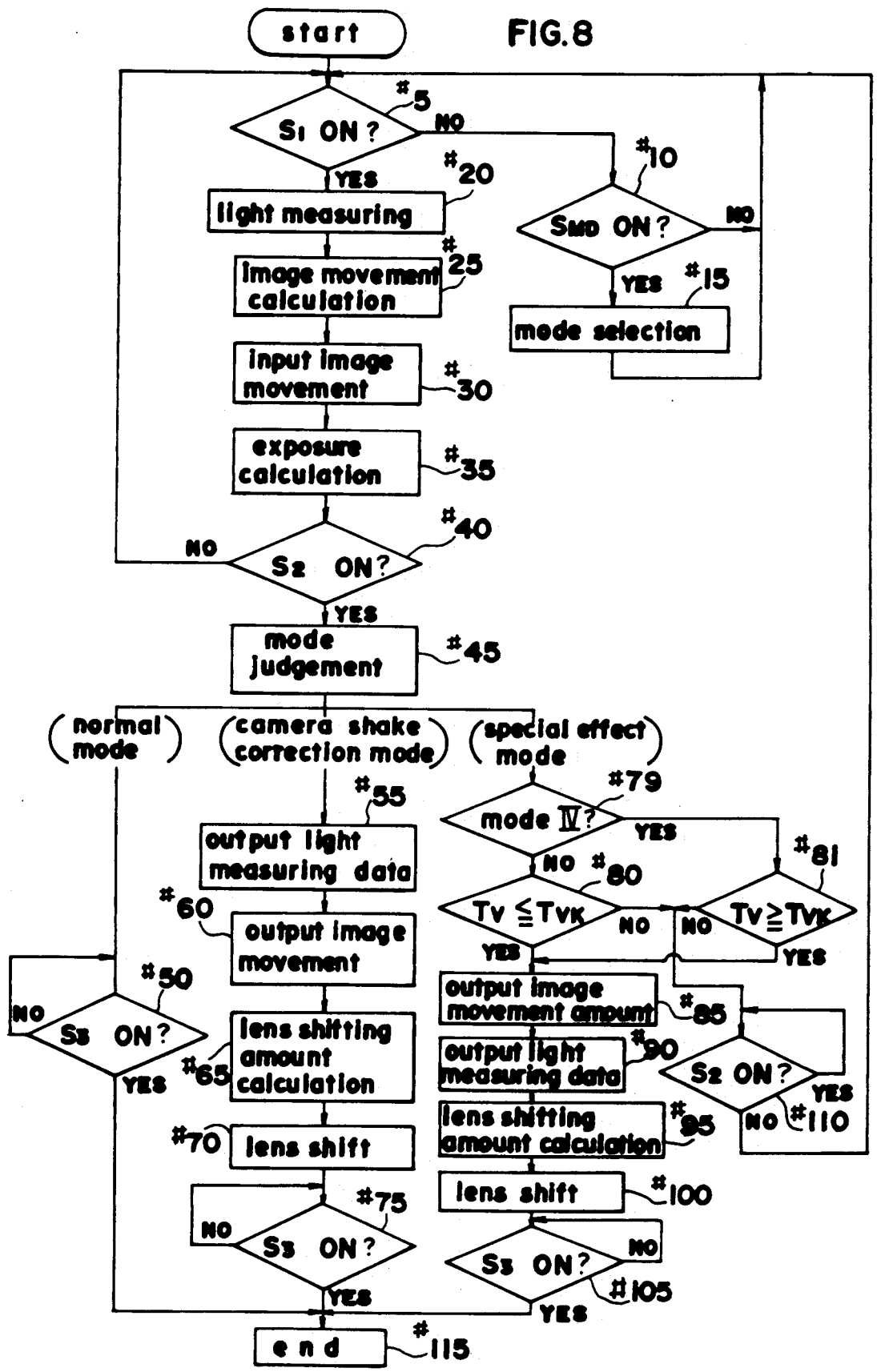
FIG. 8 is a flow chart showing actions of the first embodiment.

Referring now to a flowchart in FIG. 8, photo-taking action by a camera of this embodiment is explained.

At first, when the main switch is turned on and the camera is started, the status of switches S1 and SMD are checked (#5, #10). When switch SMD is off and switch S1 is on, normal mode is selected and normal photographs are taken in the following flow. When switch SMD is changed from off to on before switch S1 comes on, modes other than normal mode are selected, and any one of the camera shake correction mode and special effect modes I thru IV selected according to the operation of switch SMD is set up (#15). Sequentially when switch S1 is pressed, light measuring circuit 9 measures luminance of the subject, and the image movement amount on the film is calculated by the image movement sensor 1 and image movement calculation circuit 2, and light measuring data and image movement amount data are taken into microcomputer 3 (#20 to #30). The exposure calculation in carried out from the above light measuring data by microcomputer 3, and exposure control data including aperture and shutter speed is calculated (#35). Then the status of switch S2 is judged, and when it is off, the process returns to #5 and the above action is repeated. Or when the status is on, the selected photo mode in judged (#40 #45).

If normal mode is selected, the desired exposure is performed depending on aperture and shutter speed set thereby, When the finish of photo-taking is detected by switch S3, the photo-taking sequence ends (#50, #115).

If the camera shake correction mode is selected, the above light measuring data and image movement amount data are delivered from microcomputer 3 to lens shifting calculation circuit 4 (#55, #60). Lens shifting calculation circuit 4 calculates appropriate shifting direction and shifting amount of movable lens 6 which realizes correction of image movement, from entered light measuring data and image movement amount data, and delivers the result to driving circuit 7 (#65). Driving circuit 7 makes movable lens 6 shift to cancel the subject image movement on the film according to entered shifting direction and shifting amount (#70). Movable lens 6 continues shifting until the end of photo-taking is detected by switch S3 by repeating step #60 to #70. When desired exposure is performed depending on aperture and shutter speed set thereby, and when finish of photo-taking is detected by switch S3, the photo-taking sequence ends (#75, #115).

If a special mode is selected, whether the special mode is mode IV or not is at first judged (#79), and shutter speed TV is compared with limit shutter speed TVK (#80, #81). The limit shutter speed TVK means the maximum shutter speed with which movable lens 6 can be completely shifted during exposure and a desired special effect can be obtained. The limit shutter speed TVK differs depending on shifting speed and shifting amount of the movable lens 6, An example of the limit shutter speed TVK on each special effect mode on this embodiment is shown in TABLE 1.

When selected special effect mode is not mode IV and shutter speed TV is over limit shutter speed TVK, or when selected special effect mode is mode IV and shutter speed TV is not over limit shutter speed TVK, the shutter is locked and the sequence is stopped, and when switch S2 turns off, the process returns to #5 (#110). Otherwise, image movement amount in the selected special effect mode is delivered from microcomputer 3 to lens shifting calculation circuit 4, and an order to calculate shift amount of movable lens 6 in the special effect mode is delivered (#85).

TABLE 1

| Special effect mode | TVK (EV) |
|---|---|
| Mode I | 5 |
| Mode II | 3 |
| Mode III | 4 |
| Mode IV | 9 |

Then, shifting data corresponding to the special mode, which are preliminarily stored in a memory in microcomputer 3 and light measuring data, are delivered to lens shifting calculation circuit 4 (#90), and lens shifting calculation circuit 4 calculates appropriate shifting direction and shifting amount of movable lens 6 corresponding to the preset special effect mode from the light measuring data and shifting data, and the result is delivered to driving circuit 7 (#95). For example, in modes I, II and III, preferable shifting speed and shifting amount of movable lens 6 so as to move image A of subject in directions shown respectively in FIG. 3, FIG. 4 and FIG. 5 are determined and delivered to driving circuit 7. In modes IV. preferable shifting speed and shifting amount of movable lens 6 are determined so as to move image A of subject synchronously with the timing of slit scanning of the focal-plane shutter as shown in FIG. 6 and delivered to driving circuit 7. Driving circuit 7 makes movable lens 6 shift according to the above result, and moves the subject image on the film (#100). When exposure is performed depending on aperture and shutter speed set thereby, and when finish of photo-taking is detected by switch S3, photo-taking sequence ends (#105, #115).

According to the first embodiment of the present invention described above, a movable lens is mounted in the photo-taking lens so as to move a subject image on the film by shifting. Therefore, aside from normal photographs, taking photographs having special effects such as soft focus effect can easily be accomplished.

Figure 9:
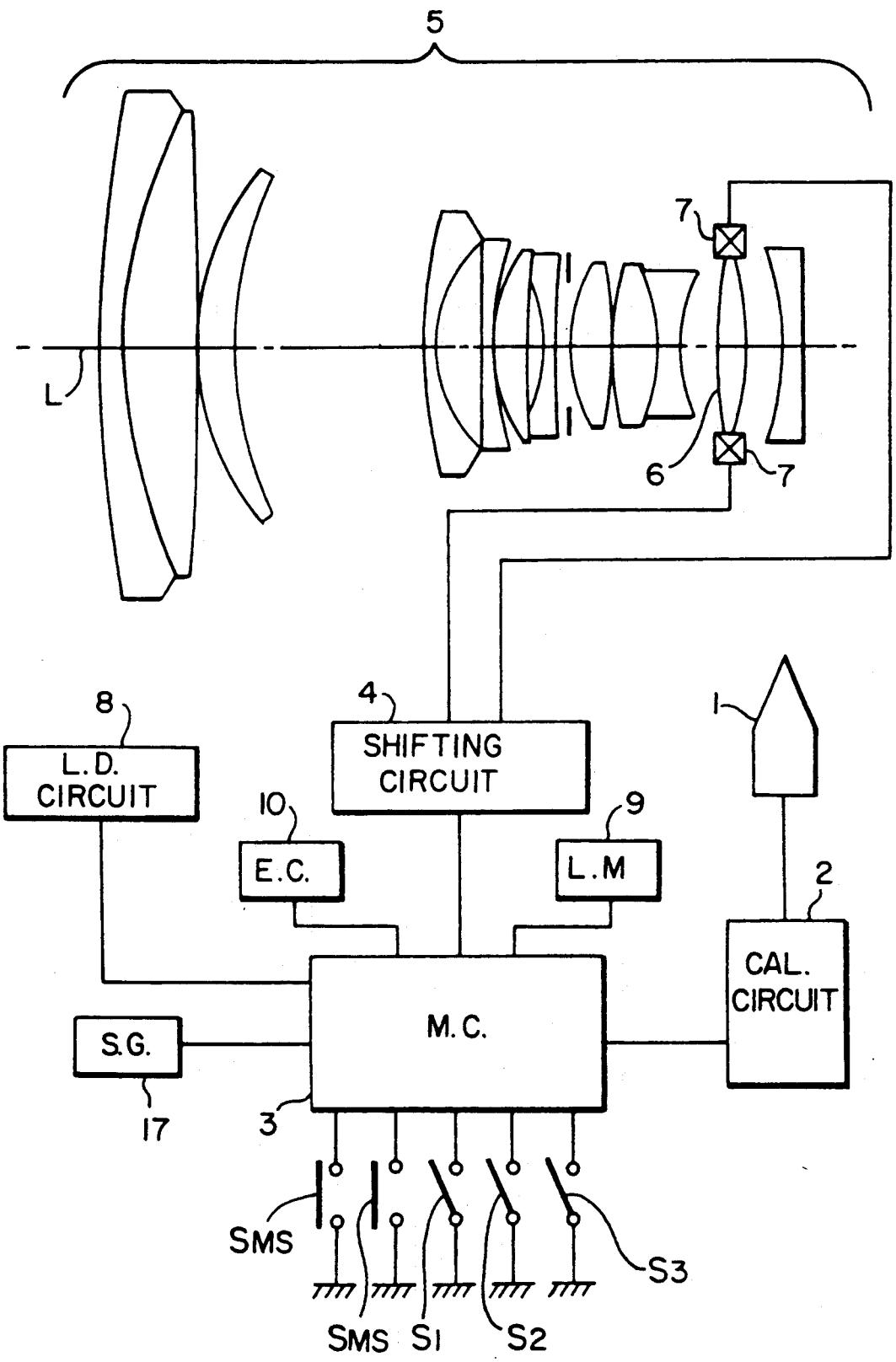
FIG. 9 is a block diagram showing structure of the second embodiment of this invention.

A second embodiment of the present invention is next described. System configuration of the camera according to the second embodiment is shown in FIG. 9. This configuration is basically the same as that in the first embodiment shown in FIG. 1, wherein identical numbers are attached to identical members. Here, if a shift mode, described below, is selected, the image movement sensor 1 can detect aside from camera shake, displacement of the image-forming position of the subject made when the camera is moved positively. The camera shown as the second embodiment provides, aside from normal mode, camera shake correction mode and shift mode. Accordingly, when mode change switch SMD is off, the normal mode is selected, otherwise, either camera shake correction mode or shift mode can be selected by operation of mode selection switch SMS. 17 is a displacement signal generator by which operator makes the above movable lens 6 shift so as to change visual range when shift mode is selected. Displacement signal generator 17 is designed to generate change in visual range in an arbitrary direction, for example, by using a ball mounted on the camera, as used a mouse, which generates two-dimensional position data according to its rotation, or with a switch for X and Y directions for delivering unit displacement data at each push.

Figure 10:
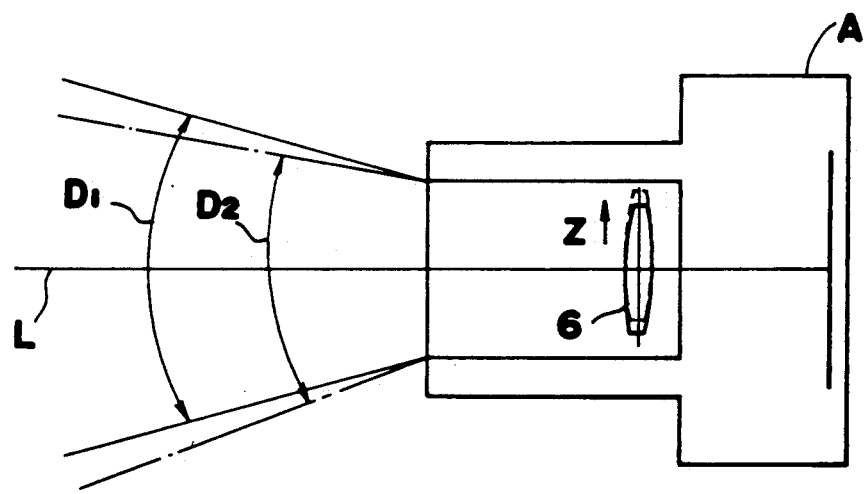
FIG. 10 is a drawing explaining the change of view range caused by movement of a correction lens.

The shift mode is to change the light path of the photo-taking lens 5 by making movable lens 6 shift, and to change visual range, thereby freely making proportions and perspective of the image. FIG. 10 shows a state of changing visual range by making movable lens 6 shift. In this figure, visual range D1 is that obtained when movable lens 6 is not shifted (in normal mode), and visual range D2 is that obtained when movable lens is shifted upward in Z-direction. As seen in the drawing, when movable lens 6 is shifted upward in Z-direction by operation of displacement signal generator 17, for example, the visual range shifts downward. Therefore it becomes possible to catch a subject located down and out of normal visual range by keeping the main body of camera A horizontal. By using this shift mode, it is easy to take photographs of a subject which cannot be captured by normal position. Or when taking photographs while the main body of camera A on a tripod, it is easy to make fine adjustment of a present proportions and perspective of the image without resetting the position of main body of camera A.

It is also possible, without using displacement signal generator 17, to make movable lens 6 shift automatically by using displacement data detected from the above displacement sensor 1 and the displacement calculation circuit 2. In this case, when microcomputer 3 takes in the above the displacement data, displacement direction and displacement amount of the camera are calculated and delivered to the shift calculation circuit 4. Shift calculation circuit 4 calculates shift amount of movable lens 6 from displacement direction and displacement amount, and delivers data to driving circuit 7 so as to move movable lens 6 in the obtained direction by the obtained amount. As described above, when the position of the camera inclines in the direction of the subject, by shifting the camera direction to the subject by force, degree of inclination is automatically judged and visual range is appropriately changed so as to cancel the inclination. Consequently, it becomes possible to capture a subject, for example, down and out of normal visual range into its visual range while keeping the camera position in the normal direction (horizontal).

Figure 11:
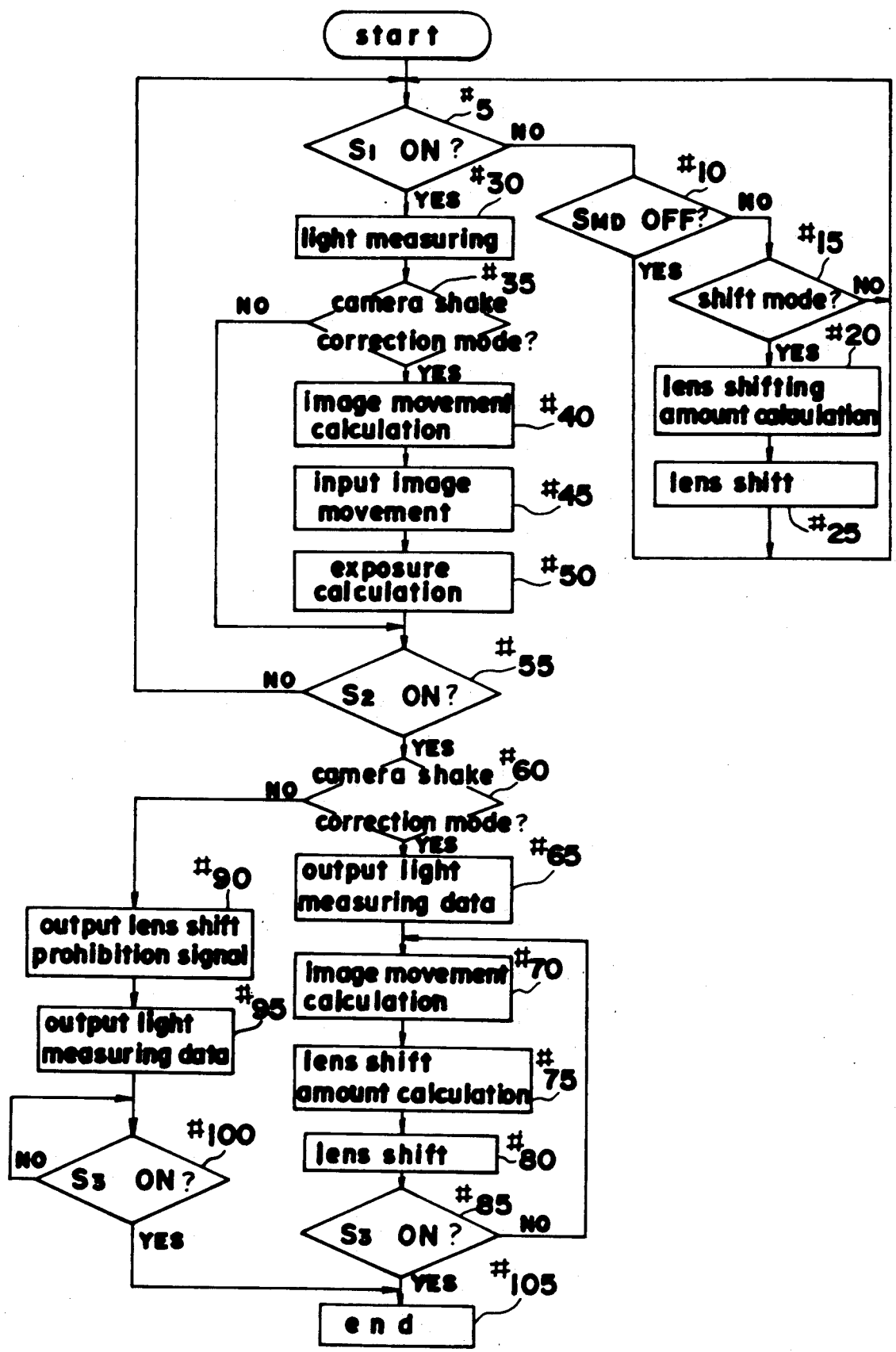
FIG. 11 is a flow chart showing actions of the second embodiment.

Referring now the flow chart in FIG. 11, photo-taking action by a camera of the second embodiment is explained.

At first, when the main switch is turned on and the camera is started, the status of switches S1 and SMD are checked (#5, #10). When switch SMD is off and switch S1 is on, normal mode is selected and normal photographs are taken in the following flow. When switch SMD is changed from off to on before switch S1 comes on, modes other than normal mode are selected, and whether the mode selected by operation of switch SMS is shift mode or not is further judged (#15). When it is not shift mode, that is, it is camera shake correction mode, the process returns to #5, and when it is shift mode, microcomputer 3 calculates shift amount of the subject on the film from the displacement signal entered from displacement signal generator 11 and delivers the result to the shift calculation circuit 4, and the shift amount of movable lens 6 is calculated by shift calculation circuit 4(#20). In a camera designed to automatically shift function, when the camera is moved by force, microcomputer 3 takes displacement data from the displacement sensor 1 and displacement calculation circuit 2, calculates the displacement direction and displacement amount of the camera, and delivers the result to the lens shift calculation circuit 4, and thereby the shift amount of movable lens 6 is calculated at lens shift calculation circuit 4. The result is delivered to driving circuit 7, and movable lens 6 is shifted in the obtained direction by obtained amount, thereby changing the visual range (#25). Sequentially, when switch S1 is turned on, light measuring circuit 9 is drivent to measure the subject luminance (#30), and whether camera shake correction mode is selected or not is judged (#35). When the camera shake correction mode is not selected, the process jumps to #55, otherwise image movement amount caused by the camera shake on the film, is calculated from data of displacement sensor 1 and displacement calculation circuit 2, and the image movement amount data is sent to microcomputer 3 (#40, #45). Microcomputer 3 calculates exposure data from the above light measuring data, and determines exposure control data including aperture and shutter speed (#50). Then, whether switch S2 is on or not is judged, and if it is off, the process returns to #5 and the above action is repeated, or if it is on, whether the selected mode is camera shake correction mode or not is judged again (#55, #60). When camera shake correction mode is selected, the above light measuring data and image movement amount data are sent from microcomputer 3 to lens shift calculation circuit 4,and preferable shift amount of movable lens 6 so as to correct camera shake is calculated in lens shift calculation circuit 4 (#65 to #75). The obtained result is delivered to driving circuit 7, and driving circuit 7 makes movable lens 6 shift according to the entered shift data of shift direction and shift amount so as to cancel displacement of the subject image on the film (#80).

Movable lens 6 continues shifting by repeating steps #70 to #80 until the end of taking photographs is detected by switch S3. When a desired exposure is carried out by aperture and shutter speed obtained thereby and the end of photo-taking is detected by switch S3, a sequence of taking photographs ends (#85, #105). When camera shake correction mode is not selected, that is, either normal mode or shift mode is selected, lens shift prohibition signal is delivered to prevent movable lens 6 from shifting, and the above light measuring data are delivered (#90, #95). When a desired exposure is carried out by aperture and shutter speed obtained thereby and the end of photo-taking is detected by switch S3, a sequence of taking photographs ends (#100, #105).

As described above, according to the second embodiment of this invention, by making use of the image movement correction mechanism having a lens movable in vertical direction to the optical axis of the phototaking lens, the visual range is designated to be changed by moving the movable lens, and as a result, the actuator structure for changing visual range becomes simple and a shift camera can be minimized in size. In addition, it is designed to calculate displacement amount of the main camera body from the direction of the subject by detecting the displacement of the subject image on the film, and to automatically change the visual range by cancelling the displacement amount. Therefore it becomes possible to easily capture a subject which is difficult to be taken without making the camera position unstable. Moreover, it is designed to mount a displacement signal generator which can freely change the visual range, and to shift the movable lens by entering displacement amount by the displacement signal generator. Therefore it becomes possible to freely make the proportions and perspective of the image the operator wants, and to easily and freely take photographs of a subject located in a difficult position.

Figure 12:
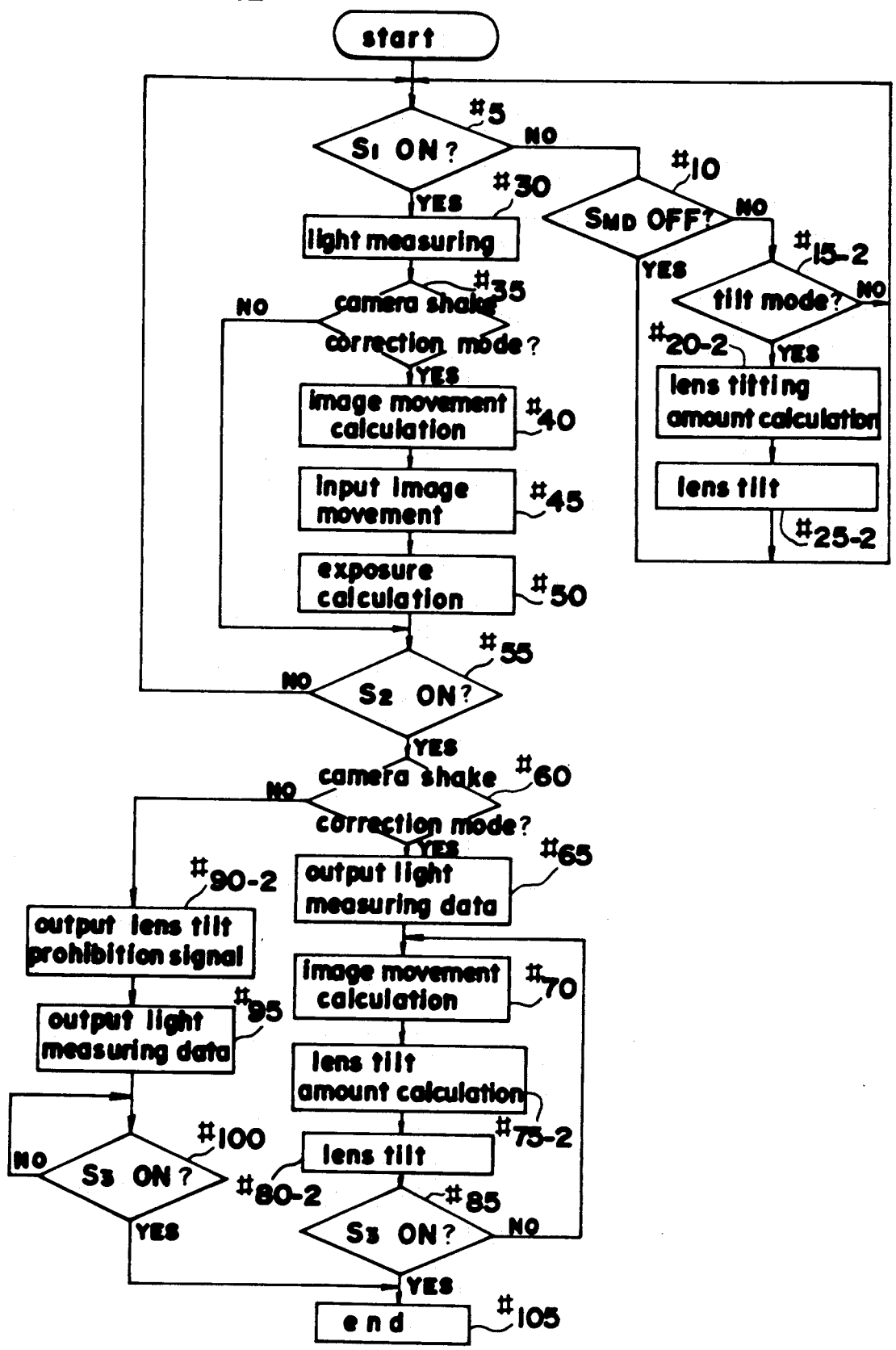
FIG. 12 is a flow chart showing actions of the third embodiment.

Referring now to the flow chart in FIG. 12, phototaking action by a camera of the third embodiment is explained.

In the second embodiment, movable lens 6 is shifted in the vertical direction Z. But in the third embodiment, movable lens 6 is tilted in $\theta$-direction shown in FIG. 2 and the camera shake is corrected by tilting movable lens 6. Therefore, steps #15, 20, 25, 75, 80, 90 in FIG. 11 are amended. Other actions of the third embodiment are same as the second embodiment.

Figure 13:
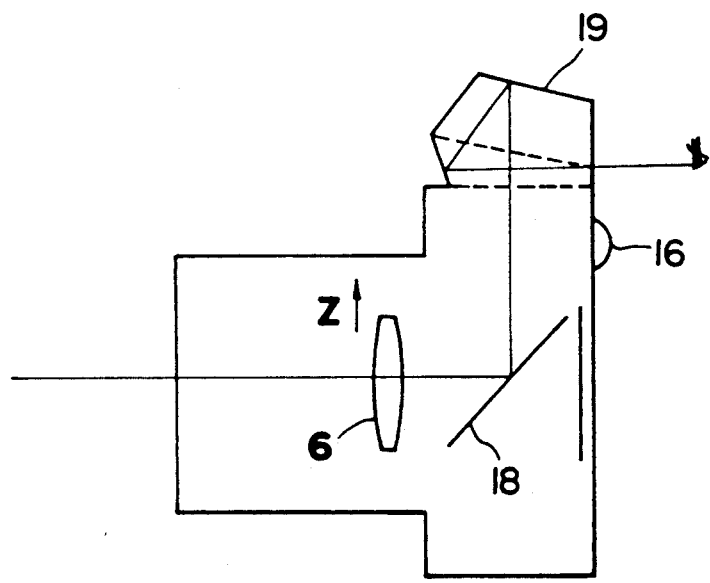
FIG. 13 is a side elevation showing structure of a single lens reflex camera applied this invention.

FIG. 13 is a side elevation showing structure of a single lens reflex camera applied the second and third embodiments. Ball 16 generates signal for shifting or tilting movable lens 6 according its rotation. 18 is a main mirror and 19 is a pentagonal roof prism. Therefore, an operator can see the change of proportions and perspective of the image exposed on the film through a view finder with rotating the ball 16.

What is claimed is:

1. A camera system comprising:
   a housing;
   a photo-taking lens mounted in the housing including a lens unit movable in a direction other than parallel to an optical axis of the photo-taking lens;
   an operable member manually operated and positioned on an exterior of the housing for movement by an operator;
   generating means for generating a signal in proportion to an operation amount of the operable member;
   calculation means for calculating a driving amount of the movable lens unit on the basis of the signal generated by the generating means, and
   drive means for driving the movable lens unit in the direction other than parallel to an optical axis of the photo-taking lens on the basis of the driving amount calculated by the calculating means, wherein proportions and field of view of an object image are changed in accordance with the movement of the movable lens unit to provide special effect photography.

2. A camera system as claimed in claim 1, wherein the movable lens unit can be used as a lens unit for correcting camera shake.

3. A camera system as claimed in claim 1, wherein the drive means drives the movable lens unit on a plane perpendicular to the optical axis of the photo-taking lens unit.

4. A camera system as claimed in claim 1, wherein the drive means drives the movable lens unit so that an optical axis of the movable lens unit tilts against the optical axis of the photo-taking lens.

5. A camera system as claimed in claim 1, wherein the camera system is a single lens reflex camera system and whereby the an operator may see the change of proportions and perspective of the object image caused by the operation of the operable member through a view finder system of the single lens reflex camera system.

6. A camera system as claimed in claim 1, wherein the operable member includes a rotational ball and the generating member generates signal so as to move the movable lens unit in direction in which the ball is rotated.

7. A camera system comprising:
a photo-taking lens including a lens unit movable in a direction other than parallel to an optical axis of the photo-taking lens;
drive means for driving the movable lens unit in the direction other than parallel to the optical axis of the photo-taking lens;
detection means for detecting any camera shake; and
control means for making the drive means drive the movable lens unit along a first path so as to compensate for the camera shake detected by the detection means in a first mode of operation for making the drive means drive the movable lens unit during an exposure along a second path to cause an image formed by the lens to move on an image plane during the exposure in a second mode of operation and for prohibiting the drive means from driving the movable lens unit.

8. A camera system comprising:
a photo-taking lens for providing an object image on an image plane, the lens including a lens unit movable in a direction other than parallel to an optical axis of the photo-taking lens;
detection means for detecting any camera shake;
correction means for correcting the camera shake by moving the movable lens unit along a first path to compensated for the camera shake on the basis of the detection result of the detection means in a first mode;
calculation means for calculating a shifting amount and a shifting direction on the basis of the detection result of the detection means when the camera system is forced to shift in a direction to an object in a second mode;
drive means for driving the movable lens unit along a second path to cause the object to move across the image plane during an exposure on the basis of the calculation result of the calculation means, so that proportions and field of view of the object image are changed in the second mode, and
exposure means for exposing a film after an operation of the driving means.

9. A camera system as claimed in claim 8, further comprising selection means for selecting a mode from the first and second modes.

10. A camera system as claimed in claim 8, wherein the drive means drives the movable lens unit on a plane perpendicular to the actual axis of the photo-taking lens in the second mode.

11. A camera system as claimed in claim 8, wherein the drive means drives the movable lens unit so that an optical axis of the movable lens unit tilts against the optical axis of the photo-taking lens in the second mode.

12. A camera system as claimed in claim 8, wherein the camera system is a single lens reflex camera system and whereby the an operator may see the change of proportions and perspective of an object image caused by the drive means through a view finder system of the single lens reflex camera system in the second mode.

13. A camera system comprising:
a photo-taking lens for forming an object image on an image plane, the photo-taking lens including a lens unit movable in a direction other than parallel to an optical axis of the photo-taking lens, and
drive means for rotating the movable lens unit about the optical axis of the photo-taking lens during an exposure operation to rotate the object image within the image plane during the exposure to produce a distorted image.

14. A camera system as claimed in claim 13, further comprising memory means for memorizing a shifting amount of the movable lens unit and wherein the drive means drives the movable lens unit on the basis of the memorized shifting amount.

15. A camera system comprising:
a photo-taking lens for forming an object image on an image plane, the photo-taking lens including a lens unit movable in a direction other than parallel to an optical axis of the photo-taking lens, and
drive means for driving the movable lens unit in the direction other than parallel to the optical axis of the photo-taking lens taking an exposure operation, so that an optical axis of the movable lens unit tilts relative to the optical axis of the photo-taking lens to translate the object image across the image plane during the exposure to produce a distorted image.

16. A camera system comprising:
a photo-taking lens including a lens unit movable in a direction other than parallel to an optical axis of the photo-taking lens;
selection means for selecting a special effect mode;
drive means for driving the movable lens unit in the direction other than parallel to the optical axis of the photo-taking lens along a predetermined path to cause the object image to move across the image plane during an exposure operation when selected by the special effect mode, and
comparison means for comparing a set shutter speed with a predetermined shutter speed and judging whether or not the movable lens unit is able to be moved on the basis of the comparison result, wherein the camera system is capable of taking photography with the special effect.

17. A camera system comprising:
a photo-taking lens including a lens unit movable in a direction other than parallel to an optical axis of the photo-taking lens;
a focal plane shutter, and
drive means for driving the movable lens unit in the direction other than parallel to the optical axis of the photo-taking lens during an exposure operation, and wherein the drive means drives the movable lens unit in response to a movement of the focal plane shutter so that special effect photography can be accomplished.

18. A camera system comprising:

a photo-taking lens including a lens unit movable in a direction other than parallel to an optical axis of the photo-taking lens;

drive means for driving the movable lens unit in the direction other than parallel to the optical axis of the photo-taking lens;

detection means for detecting any camera shake;

selection means for selecting a mode among a plurality of special effect modes, and control means for making drive means drive the movable lens unit along a first path so as to compensate for the camera shake detected by the detection means in a first mode of operation, for making the drive means drive the movable lens unit during an exposure along a predetermined path according to the selected special effect mode to cause an image formed by the lens to move on an image plane during the exposure in a second mode of operation.

* * * * *